April 13, 1954     D. L. HAINES     2,675,252
TANK FITTING AND METHOD OF MAKING SAME
Filed Aug. 22, 1950
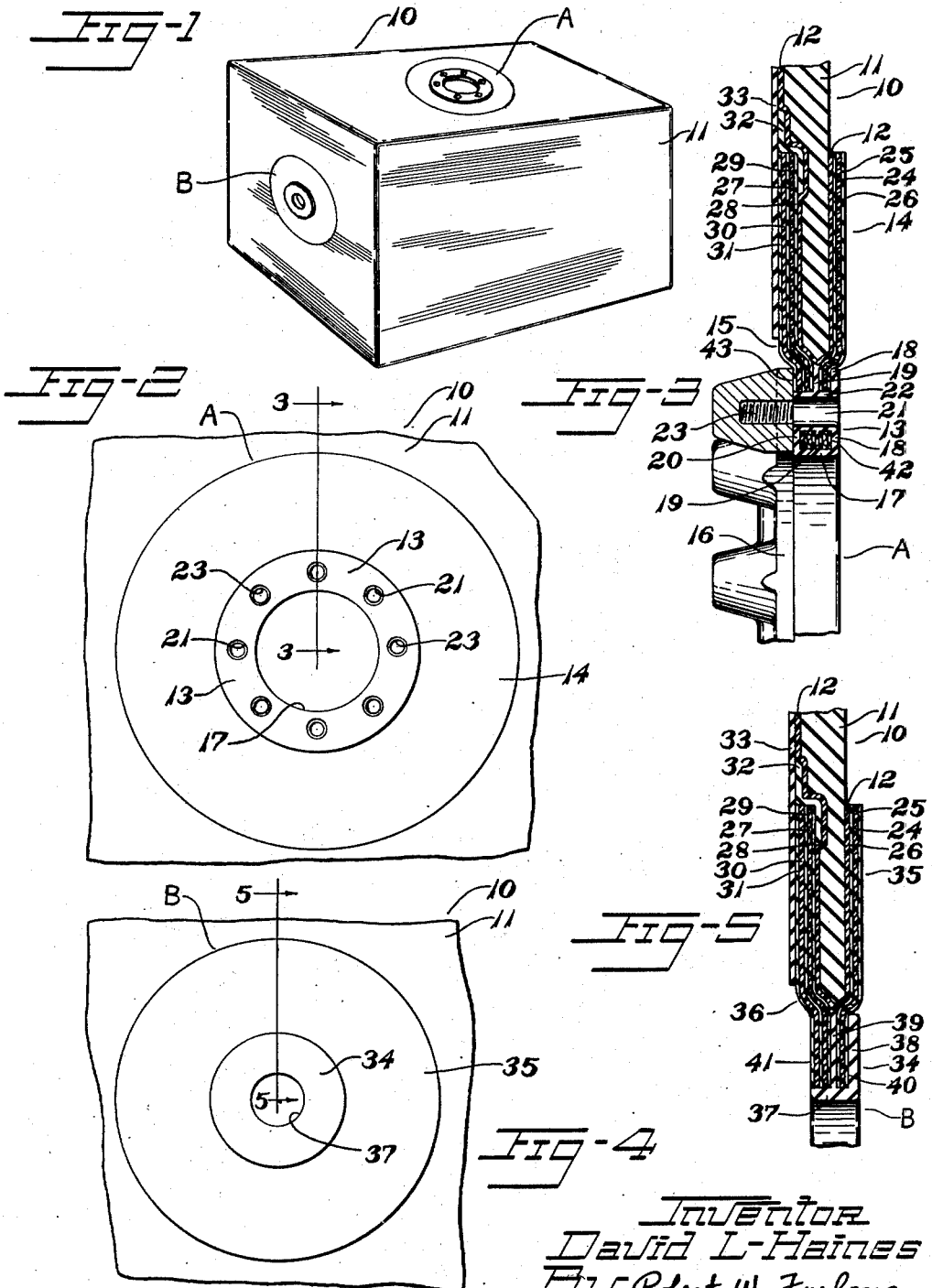
Inventor
David L. Haines
By Robert W. Furlong
Atty Patented Apr. 13, 1954

2,675,252

UNITED STATES PATENT OFFICE 2,675,252

TANK FITTING AND METHOD OF MAKING SAME

David L. Haines, Akron, Ohio, assignor to The B. F. Goodrich Company, New York, N. Y., a corporation of New York Application August 22, 1950, Serial No. 180,736

6 Claims. (Cl. 285—38)

This invention relates to a light weight fitting for providing an opening in the wall of a container and pertains more particularly to a light weight tank fitting for flexible fuel cells and the like, such as gasoline and oil tanks employed in aircraft, and the method of making same.

It is an object of this invention to provide a light weight fitting for fuel cells and the like.

Another object of this invention is to provide a tank fitting for fuel cells and the like which prevents a fuel, such as gasoline and oil or other liquid hydrocarbon fuel, contained in the tank from seeping into the tank wall causing it to deteriorate.

It is also an object of this invention to provide a tank fitting which prevents a fluid contained in the tank from diffusing through the fitting to the exterior wall surfaces of the tank causing a serious fire hazard if the fluid is of an inflammable nature.

Still another object of this invention is to provide a tank fitting for fuel cells and the like which can accommodate either a flush or recessed type opening in the tank wall.

Still another object of this invention is to provide a method of making a tank fitting for puncture-sealing fuel cells and the like which can be secured to the walls of the fuel container without requiring clamping means.

It is also an object of this invention to provide a tank fitting for fuel cells, such as gasoline and oil tanks employed in aircraft, which can conveniently and economically be manufactured.

Other objects of this invention will be apparent from the drawings and description which follow.

Conventional tank fittings for forming an opening in a tank wall enabling fuel connections, supporting means, and the like, to be inserted into the tank have not been entirely satisfactory, in that fuels detrimental to the tank wall often diffuse through the walls of the fitting and into the tank wall causing deterioration thereof and consequently the destruction of the confining properties of the tank. Furthermore, conventional tank fittings are relatively weighty and bulky which is unsatisfactory in fuel tanks employed in aircraft, and conventional fittings generally consist of rigid molded members thereby preventing the fitting from being used interchangeably for flush, angular or recessed type openings in the tank wall.

The present invention satisfies all of the objects set forth above and avoids the deficiencies inherent in tank fittings heretofore known.

In teaching my invention two embodiments are shown and described, however, it will be understood that they are merely illustrative of my invention and that I do not intend to limit my invention to these two embodiments.

In the drawings:

Fig. 1 is a view in perspective of a fuel cell showing two fuel cell fittings within the purview of this invention;

Fig. 2 is an enlarged top plan view of fitting "A" shown in Fig. 1;

Fig. 3 is a section on the line 3—3 of Fig. 2;

Fig. 4 is an enlarged top plan view of fitting "B" shown in Fig. 1; and

Fig. 5 is a section on the line 5—5 of Fig. 4.

Referring to the drawings, Fig. 1 shows a relatively flexible fuel cell 10 for confining gasoline or oil and the like having a tank wall 11 of conventional laminated fabric and rubber construction and two tank fittings "A" and "B." A flexible fuel-impervious barrier 12, preferably a nylon film or coating, is applied over the entire inner face of tank wall 11 and along the peripheries of the openings extending over the circumferential areas around the openings on the outer face of tank wall 11, as shown in Fig. 3 and Fig. 5.

As shown in Figs. 2 and 3, fitting "A" comprises collar 13, flanges 14 and 15 extending radially outwardly from collar 13 and disposed over opposite faces of tank wall 11, and a rigid metallic base member 16 all secured together.

Collar 13 which preferably comprises a molded gasoline-resistant flexible material such as neoprene (a polymer of chloroprene) or a rubbery copolymer of butadiene-1,3 and acrylonitrile is generally annular in form and includes an inner peripheral wall 17 and three radially outwardly extending ribs 18, 19 and 20 integral with wall 17. Apertures 21, 21 extending through ribs 18, 19 and 20 are provided at spaced intervals, each aperture 21 being enclosed by a rubbery sleeve 22 integral with ribs 18, 19 and 20.

Collar 13 is adherently secured along its inner face to base member 16 which comprises a rigid gasoline-resistant metal composition, such as aluminum, and has included therein tapped holes 23 in registry with apertures 21, 21 for securing a cover, connection or the like (not shown) to tank 10 by means of bolts extending into tapped holes 23.

Outer flange 14 is disposed between and secured to ribs 18 and 19 of collar 13, and includes a flexible fabric reinforcing member 24, preferably comprising a square-woven nylon fabric, coated and impregnated on its outer and inner faces with layers 25 and 26 respectively of gasoline-resistant rubbery material, such as neoprene.

Inner flange 15 which is disposed between ribs 19 and 20 of collar 13 and secured thereto has a construction similar to outer flange 14 and includes a flexible fabric-reinforcing member 27 coated and impregnated with rubbery layers 28 and 29, preferably comprising neoprene, on its outer and inner faces respectively, a flexible barrier layer 30 which is impervious to hydrocarbon fuels, such as nylon or polyvinyl alcohol, disposed over the inner face of layer 29, and a rubbery layer 31 of gasoline-resistant rubber-like material, such as neoprene and the like, disposed over the inner face of barrier layer 30.

A preferred method of securing fitting "A" to tank wall 11 comprises adhering flange 14 over the outer face of wall 11 and barrier 12, as shown in Fig. 3, and adhering flange 15 over the inner face of wall 11 and barrier 12. A sealing strip 32 interposed between barrier 12 and flange 15 provides a fluid-tight seal preventing fuel from "wicking" along reinforcing member 27 and from seeping between the juncture of tank wall 11 with flange 15. A flexible resilient liner ply 33 of gasoline-resistant rubber-like material, such as neoprene, is disposed over the inner face of flange 15 and the entire exposed inner face of tank wall 11 providing additional protection for tank wall 11 from the fuel contained in tank 10.

As shown in Figs. 4 and 5, fitting "B" is generally similar to fitting "A" and comprises a resilient rubbery collar 34, preferably including a gasoline-resistant rubber-like material such as neoprene, and flanges 35 and 36 extending radially outwardly in a spaced-apart face-to-face relationship from collar 34, flange 35 having the same laminated structure as flange 14 of fitting "A" and flange 36 having the same laminated structure as flange 15 of fitting "A." Collar 34 comprises an inner peripheral wall 37 and ribs 38 and 39 extending radially outwardly from wall 37 and being integral therewith and provides an anchoring means to which the inner circumferential zones 40 and 41 of flanges 35 and 36 respectively are secured, zone 40 being disposed between and secured to ribs 38 and 39 and zone 41 being secured to rib 39. Fitting "B" may be secured to tank wall 11 in the same manner as fitting "A" is secured to tank wall 11 as described above.

A preferred method of manufacturing a fitting within the purview of this invention is to dispose rubbery layer 25 over the outer face of fabric reinforcing member 24 and rubbery layer 26 over the inner face of reinforcing member 24. Pressure is exerted on the laminated structure which impregnates rubbery layers 25 and 26 into fabric-reinforcing member 24 bonding the assembly into an integral unit. The appropriate configuration of flange 14 is cut from the laminated sheet.

The laminated structure from which flange 15 is shaped is formed by disposing rubbery layer 28 over the inner face of fabric-reinforcing member 27 and rubbery layer 29 over the outer face of reinforcing member 27. Barrier 30 is then applied over the outer face of rubbery layer 29, preferably as a solution of nylon dissolved in a volatile solvent which may be applied to the outer face of rubbery layer 29 in any conventional manner, such as by spraying, brushing, spreading, etc., subsequently allowing the solvent to evaporate from the coating providing a gasoline-impervious film or coating of nylon over the outer surface of rubbery layer 29. Rubbery layer 31 is disposed over the outer face of barrier 30 and the assembly is subjected to pressure which bonds the assembly into an integral sheet. Flange 15 is then cut from the laminated assembly.

Flange 14 and flange 15 are assembled with collar 13 which may be an integral molded member or a member built up from strips of the rubber-like material to form the desired configuration.

Base member 16, if it is desired to have a base member incorporated with the fitting, and collar 13 are assembled together, and base member 16, collar 13, the inner circumferential zone 42 of flange 14 lying in contacting relationship with collar 13 and the inner circumferential zone 43 of flange 15 lying in contacting relationship with collar 13 are heated in a mold to vulcanize collar 13 and zones 42 and 43 together and to securely bond base member 15 to the inner face of collar 13 forming an integral assembly, the remaining portions of flanges 14 and 15 remaining in an unvulcanized condition.

The tank fitting is secured to tank wall 11 of fuel cell 10, preferably in the manner described above, and cell 10 is vulcanized which consequently vulcanizes the unvulcanized portions of flanges 14 and 15 securely bonding the tank fitting to tank wall 11 of cell 10. By vulcanizing those portions of flanges 14 and 15 which adhere to tank wall 11 subsequent to assembling the fitting with fuel cell 10, a more satisfactory bond is contained between the fitting and tank wall 11 improving the serviceability of fuel cell 10.

A tank fitting within the purview of this invention is suitable as a tank fitting for any flush, angular or recessed type opening, since the flexible resilient flanges readily conform to the varying contours of the tank wall bounding the various type openings.

The gasoline-impervious barrier interposed between the inner and outer faces of the flange secured over the inner face of the tank wall prevents the fluid contained in the tank from diffusing through the flange and into a sealant layer of the tank wall causing the sealant layer to prematurely swell weakening the tank wall and destroying the puncture-sealing properties of the tank.

Furthermore, my tank fitting prevents inflammable fluids contained in the tank from seeping through and around the fitting onto the outer surfaces of the tank which condition would greatly increase the hazard of fire and also the deterioration of the tank itself.

Tank fitting constructed in accordance with my invention do not require weighty fastening means to secure the fitting to the tank wall thereby reducing the weight and size of the tank which factors are extremely important when the tank is employed in aircraft and the like.

By vulcanizing the flanges of my fitting subsequent to assembling the fitting with the tank wall, a more satisfactory bond between the flanges and the tank wall is obtained as compared with the bond between a conventional tank fitting and the tank wall increasing the durability of the tank while maintaining the flanges flexible.

Furthermore, great savings of labor and time are realized in the manufacture and assembly of tank fittings within the purview of this invention as compared with the manufacture and assembly of conventional fittings.

It is clear that obvious modifications and variations of my invention may be made without departing from the spirit and scope of this invention as defined in the appended claims.

I claim:

1. A fuel cell comprising a flexible wall member having an opening therein adapted to receive a tank fitting and having a thin flexible continuous barrier layer of material impervious to liquid hydrocarbon fuels extending over the entire inner face of said wall member, over the entire edge of said wall member bounding said opening and over the outer face of said wall member adjacent said opening, and a tank fitting for said opening, said tank fitting comprising a gasoline-resistant flexible resilient collar, a relatively thin flexible resilient flange extending radially outwardly from said collar and a second relatively thin flexible resilient flange extending radially outwardly from said collar and generally parallel to the first said flange, said second-mentioned flange having a layer of gasoline-impervious material interposed between its inner and outer faces, the first said flange being secured along its outer peripheral margin over the outer face of said wall member and over the said barrier layer along a zone adjacent said opening, the said second-mentioned flange being secured along its outer peripheral margin over the inner face of said wall member and over the said barrier layer along a zone adjacent said opening.

2. A fuel cell comprising a flexible wall member having an opening therein adapted to receive a tank fitting, a thin flexible continuous barrier layer of material impervious to liquid hydrocarbon fuels extending over the entire inner face of said wall member, over the entire edge of said wall member bounding said opening and over the outer face of said wall member adjacent said opening, and a tank fitting for said opening, said tank fitting comprising a gasoline-resistant flexible resilient collar comprising a rubbery conjugated diene polymer, a relatively thin flexible resilient flange extending radially outwardly from said collar and a second relatively thin flexible resilient flange extending radially outwardly from said collar in face-to-face spaced-apart relationship to the first said flange, said first-mentioned flange comprising a flexible fabric-reinforcing member having a flexible resilient gasoline-resistant layer comprising a rubbery conjugated diene polymer disposed over its inner face and over its outer face, said second-mentioned flange comprising a flexible fabric-reinforcing member having a flexible resilient gasoline-resistant material comprising a rubbery conjugated diene polymer disposed over its inner and outer faces, a flexible layer of gasoline-impervious material interposed between said fabric-reinforcing member and the outer face of said second-mentioned flange and a flexible resilient gasoline-resistant layer comprising a rubbery conjugated diene polymer disposed over the outer face of the said gasoline-impervious layer included in said second-mentioned flange, the first said flange being secured along its outer peripheral margin over the outer face of said wall member and over the said barrier layer along a zone adjacent said opening, the said second-mentioned flange being secured along its outer peripheral margin over the inner face of said wall member and over the said barrier layer along a zone adjacent said opening.

3. A fuel cell comprising a flexible wall member having an opening therein adapted to receive a tank fitting, a thin flexible continuous barrier layer of material impervious to liquid hydrocarbon fuels extending over the entire inner face of said wall member, over the entire edge of said wall member bounding said opening and over the outer face of said wall member adjacent said opening, and a tank fitting for said opening, said tank fitting comprising a gasoline-resistant flexible resilient collar of a material including a rubbery conjugated diene polymer, said collar comprising a relatively thin generally annular shaped wall and three radially outwardly extending generally parallel ribs, said ribs being integral with said annular shaped wall, a relatively thin flexible resilient flange extending radially outwardly from said annular shaped wall of said collar and secured along its inner periphery between the outermost said rib of said collar and the intermediate said rib of said collar and a second relatively thin flexible resilient flange extending radially outwardly from said annular shaped wall of said collar and in face-to-face spaced relationship to said first-mentioned flange, said second-mentioned flange being secured along its inner periphery between the intermediate said rib of said collar and the innermost rib of said collar, said second-mentioned flange having a layer of gasoline-impervious material interposed between its inner and outer faces and extending from the outer periphery of said annular shaped wall of said collar to the outer periphery of the flange, the said first-mentioned flange being secured along its outer peripheral margin over the outer face of said wall member of said cell and over the said barrier layer along a zone adjacent said opening, the said second-mentioned flange being secured along its outer peripheral margin over the inner face of said wall member of said cell and over the said barrier layer along a zone adjacent said opening.

4. A fuel cell comprising a flexible wall member having an opening therein adapted to receive a tank fitting, a thin flexible continuous barrier layer of material impervious to liquid hydrocarbon fuels extending over the entire inner face of said wall member, over the entire edge of said wall member bounding said opening and over the outer face of said wall member adjacent said opening, and a tank fitting for said opening, said tank fitting comprising a gasoline-resistant flexible resilient collar of a material including a rubbery conjugated diene polymer, said collar comprising a relatively thin generally annular shaped wall and three radially outwardly extending generally parallel ribs, said ribs being integral with said annuar shaped wall, a relatively thin flexible resilient flange extending radially outwardly from said annular shaped wall of said collar and secured along its inner periphery between the outermost said rib of said collar and the intermediate said rib of said collar and a second relatively thin flexible resilient flange extending radially outwardly from said annular shaped wall of said collar and in face-to-face spaced relationship to said first-mentioned flange, said second-mentioned flange being secured along its inner periphery between the intermediate said rib of said collar and the innermost rib of said collar, said first-mentioned flange comprising a flexible fabric-reinforcing member having a flexible resilient gasoline-resistant layer comprising a rubbery conjugated diene polymer disposed over its inner face and over its outer face, said second-mentioned flange comprising a flexible fabric-reinforcing member having a flexible resilient gasoline-resistant material comprising a rubbery conjugated diene polymer disposed over its inner face and over its outer face, a flexible layer of gasoline-impervious material interposed between said fabric-reinforcing member and the outer face of said second-mentioned flange and extending from the outer periphery of said annular shaped wall of said collar to the outer periphery of the flange and a flexible resilient gasoline-resistant layer comprising a rubbery conjugated diene polymer disposed over the outer face of the said gasoline-impervious layer included in said second flange, the said first-mentioned flange being secured along its outer peripheral margin over the outer face of said wall member of said cell and over the said barrier layer along a zone adjacent said opening, the said second-mentioned flange being secured along its outer peripheral margin over the inner face of said wall member of said cell and over the said barrier layer along a zone adjacent said opening.

5. A tank fitting adapted to be associated with a fuel cell, said tank fitting comprising a gasoline-resistant flexible resilient collar of a material including a rubbery conjugated diene polymer, said collar comprising a relatively thin generally annular shaped wall and three radially outwardly extending generally parallel ribs, said ribs being integral with said wall, a relatively thin flexible resilient flange extending radially outwardly from said wall, and a second relatively thin flexible resilient flange extending radially outwardly from said wall in face-to-face spaced reationship to the first-mentioned said flange, the first-mentioned said flange being secured along its inner peripheral margin between the intermediate said rib and one of the remaining said ribs and the second-mentioned said flange being secured along its inner peripheral margin between the intermediate said rib and the other of the said remaining ribs, said second-mentioned flange having a gasoline-impervious barrier interposed between its inner and outer faces and extending from the outer periphery of said annular shaped wall of said collar to the outer periphery of the flange.

6. A tank fitting adapted to be associated with a fuel cell, said tank fitting comprising a gasoline-resistant flexible resilient collar of a material including a rubbery conjugated diene polymer, said collar comprising a relatively thin generally annular shaped wall and three radially outwardly extending generally parallel ribs, said ribs being integral with said wall, a relatively thin flexible resilient flange extending radially outwardly from said wall, and a second relatively thin flexible resilient flange extending radially outwardly from said wall in face-to-face relationship to the first-mentioned said flange, the first-mentioned said flange being secured along its inner peripheral margin between the intermediate said rib and one of the remaining said ribs and the second-mentioned said flange being secured along its inner peripheral margin between the intermediate said rib and the other of the said remaining ribs, the first-mentioned said flange comprising a flexible fabric-reinforcing member having a flexible resilient gasoline-resistant layer comprising a rubbery conjugated diene polymer disposed over its inner face and over its outer face, the second-mentioned said flange comprising a flexible fabric-reinforcing member having a flexible resilient gasoline-resistant material comprising a rubbery conjugated diene polymer disposed over its inner face and over its outer face, a flexible gasoline-impervious barrier interposed between said fabric-reinforcing member and the outer face of said second-mentioned flange and extending from the outer periphery of said annular shaped wall of said collar to the outer periphery of the flange and a flexible resilient gasoline-resistant layer comprising a rubbery conjugated diene polymer disposed over the outer face of said barrier.

References Cited in the file of this patent

UNITED STATES PATENTS

| Number | Name | Date |
|---|---|---|
| 2,363,508 | Doster et al. | Nov. 28, 1944 |
| 2,366,442 | Cunningham | Jan. 2, 1945 |
| 2,441,009 | Cunningham | May 4, 1948 |
| 2,459,747 | Kolbe | Jan. 18, 1949 |
| 2,630,340 | Gaylard et al. | Mar. 3, 1953 |